(12) United States Patent
Dubiel

(10) Patent No.: US 10,596,530 B2
(45) Date of Patent: Mar. 24, 2020

(54) VARIABLE VENTURI DEVICE WITH ADJUSTABLE VALVE STEM

(71) Applicant: Chapin Manufacturing, Inc., Batavia, NY (US)

(72) Inventor: David Dubiel, N. Chili, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 9 days.

(21) Appl. No.: 16/038,844

(22) Filed: Jul. 18, 2018

(65) Prior Publication Data

US 2019/0022606 A1 Jan. 24, 2019

Related U.S. Application Data

(60) Provisional application No. 62/534,383, filed on Jul. 19, 2017.

(51) Int. Cl.
*B01F 5/04* (2006.01)
*F16K 1/38* (2006.01)
(Continued)

(52) U.S. Cl.
CPC ............ *B01F 5/0413* (2013.01); *B01F 5/043* (2013.01); *B01F 5/0496* (2013.01); *B05B 7/2443* (2013.01); *B05B 12/1418* (2013.01); *F16K 1/04* (2013.01); *F16K 1/06* (2013.01); *F16K 1/385* (2013.01); *F16K 1/487* (2013.01); *F16K 31/50* (2013.01); *B01F 2005/004* (2013.01); *B01F 2005/0435* (2013.01); *B01F 2005/0436* (2013.01); *B01F 2215/0009* (2013.01); *B05B 7/0408* (2013.01); *B05B 15/30* (2018.02); *F16K 19/00* (2013.01)

(58) Field of Classification Search
CPC ... B05B 7/2443; B05B 12/1418; B01F 5/043; B01F 5/0496; B01F 2005/004; B01F 2005/0436; B01F 2215/0009; B01F 2005/0435; F16K 1/04; F16K 1/385; F16K 1/487; F16K 1/06
See application file for complete search history.

(56) References Cited

U.S. PATENT DOCUMENTS 2,606,573 A * 8/1952 Brobeck .............. G05D 7/0635
                                                    138/41
3,799,195 A * 3/1974 Hermans ................... B01F 3/02
                                                    137/553
(Continued)

*Primary Examiner* — Matthew W Jellett
*Assistant Examiner* — Christopher D Ballman
(74) *Attorney, Agent, or Firm* — Woods Oviatt Gilman LLP; Katherine H. McGuire, Esq.

(57) ABSTRACT

A fluid injection device includes a housing and a valve stem. The housing includes an inlet arm having an inlet orifice for receiving a feeder fluid. An outlet arm has an outlet orifice to discharge a mixed fluid. A venturi tube is between the inlet and outlet arms. The inlet arm, veturi tube and outlet arm define a nonlinear fluid pathway where the venturi tube redefines a portion of the nonlinear fluid pathway as a constricted fluid pathway. A diverter port is used to divert a portion of the feeder fluid from the inlet arm into the container and an injection port is used to receive product from the container. A valve arm is collinearly aligned with the venturi tube and the valve stem is positioned within the valve arm and adjusts the volume of the constricted fluid pathway.

12 Claims, 7 Drawing Sheets

(51) Int. Cl.
*F16K 1/04* (2006.01)
*F16K 1/48* (2006.01)
*B05B 12/14* (2006.01)
*B05B 7/24* (2006.01)
*F16K 1/06* (2006.01)
*F16K 31/50* (2006.01)
*B05B 15/30* (2018.01)
*B01F 5/00* (2006.01)
*B05B 7/04* (2006.01)
*F16K 11/00* (2006.01)

(56) References Cited

U.S. PATENT DOCUMENTS

| | | | | |
|---|---|---|---|---|
| 4,123,800 A | * | 10/1978 | Mazzei | B01F 5/0415 137/888 |
| 4,280,969 A | * | 7/1981 | Swanson | F02M 9/103 261/62 |
| 4,369,921 A | | 1/1983 | Beiswenger et al. | |
| 4,468,127 A | * | 8/1984 | Agosta | B01F 5/0403 137/114 |
| 4,545,535 A | | 10/1985 | Knapp | |
| 4,595,121 A | * | 6/1986 | Schultz | B01F 5/0413 116/DIG. 8 |
| 4,648,534 A | * | 3/1987 | Esser | B67D 1/0412 222/373 |
| 4,690,179 A | * | 9/1987 | Bleth | B01F 5/0413 137/625.15 |
| 4,846,214 A | | 7/1989 | Strong | |
| 4,901,923 A | | 2/1990 | McRoskey et al. | |
| 5,211,916 A | * | 5/1993 | Cheng | B01D 19/0005 422/107 |
| 5,304,093 A | * | 4/1994 | Sharp | G05D 7/0635 454/61 |
| 5,758,799 A | | 6/1998 | Patterson | |
| 6,210,123 B1 | * | 4/2001 | Wittrisch | F04F 5/466 417/194 |
| 6,364,625 B1 | * | 4/2002 | Sertier | F02M 37/025 417/151 |
| 6,425,534 B2 | | 7/2002 | Ketcham et al. | |
| 6,749,133 B1 | | 6/2004 | Ketcham et al. | |
| 6,877,890 B2 | * | 4/2005 | Whiteley | B01F 5/0413 137/893 |
| 6,896,203 B1 | | 5/2005 | Restive | |
| 6,988,675 B2 | * | 1/2006 | Hubmann | B01F 5/0413 239/302 |
| 7,118,049 B2 | | 10/2006 | Dodd | |
| 7,237,728 B1 | | 7/2007 | Laible | |
| 7,416,326 B2 | * | 8/2008 | Sakata | A61L 2/18 137/889 |
| 7,513,442 B2 | | 4/2009 | Dodd | |
| 7,866,626 B1 | | 1/2011 | MacLean-Blevins | |
| 8,690,079 B2 | | 4/2014 | MacLean-Blevins | |
| 9,095,825 B2 | | 8/2015 | Gilmore et al. | |
| 9,347,008 B2 | * | 5/2016 | Kuske | C10J 3/22 |
| 9,427,755 B2 | | 8/2016 | Birrenkott et al. | |
| 9,480,995 B2 | | 11/2016 | Hubmann et al. | |
| 9,605,625 B2 | * | 3/2017 | Balsdon | F02M 25/0836 |
| 9,635,922 B2 | * | 5/2017 | Logsdon | A45D 20/12 |
| 9,700,826 B2 | * | 7/2017 | Kim | B05B 7/0425 |
| 10,053,351 B2 | * | 8/2018 | Van Der Weij | B01F 3/0446 |
| 10,183,262 B2 | * | 1/2019 | Lambinet | B01F 5/0495 |
| 2002/0008161 A1 | * | 1/2002 | Ketcham | B05B 7/2443 239/310 |
| 2006/0219967 A1 | * | 10/2006 | Wang | F16K 5/06 251/124 |
| 2011/0139284 A1 | | 6/2011 | Dyer | |
| 2015/0007900 A1 | * | 1/2015 | Li | B01F 5/0428 137/892 |
| 2015/0190825 A1 | | 7/2015 | Arminak et al. | |
| 2015/0361994 A1 | * | 12/2015 | Furet | B01F 5/0428 417/192 |
| 2017/0348736 A1 | * | 12/2017 | Marino | F04B 1/14 |
| 2018/0043319 A1 | * | 2/2018 | Schneider | B01F 15/00935 |

\* cited by examiner

VARIABLE VENTURI DEVICE WITH ADJUSTABLE VALVE STEM

CROSS REFERENCE TO RELATED APPLICATIONS

This application claims the benefit of U.S. Provisional Patent Application No. 62/534,383, filed Jul. 19, 2017, which is hereby incorporated by reference in its entirety.

FIELD OF THE INVENTION

The present invention generally relates to fluid injection systems and devices for dispensing a diluted product from a container, and more particularly to a fluid injection system and device comprising a venturi tube for drawing product from the container to dilute and dispense the diluted product, and still more particularly to a fluid injection system and device comprising an adjustable variable venturi tube for selectively controlling the spray application of the diluted product.

BACKGROUND OF THE INVENTION

Fluid injection systems, such as sprayers, suffer from a number of drawbacks. First, current systems fail to accurately inject product at the desired rate and concentration. For instance, some systems require continuous dilution of the product within the container prior to spraying. As such, the concentration of product being dispensed decreases over time. These and other systems are also unable to inject small, continuous quantities of product into the feeder fluid so as to produce a diluted product at low concentration. Instead, such systems periodically inject discrete aliquots of product into the fluid stream. Alternative systems divert a portion of the feeder fluid from the fluid path and use this portion to push product out of the container and into the fluid stream. However, such systems require multiple components making adjusting the feed rate and resultant dilution difficult and time consuming.

Thus, there remains a need for a fluid injection system and device including a venturi tube with an adjustable valve stem that operates to change the pressure differential across the venturi tube to allow for an adjustable, settable pressure differential for selectively setting the desired feed rate of the product within a dilution type feeder device. The present invention satisfies these, as well as other, needs.

SUMMARY OF THE INVENTION

In view of the above and in accordance with an aspect of the present invention, the present invention is generally directed to a fluid injection device configured for use with a container holding a product to be dispersed. The fluid injection device may comprise a housing having an inlet arm defining an inlet tube having an inlet orifice configured to receive a feeder fluid and an outlet arm defining an outlet tube having an outlet orifice configured to discharge a mixed fluid of the product and feeder fluid. A venturi tube is between the inlet tube and the outlet tube, wherein the inlet tube, veturi tube and outlet tube define a nonlinear fluid pathway between the inlet orifice and the outlet orifice. The venturi tube redefines at least a portion of the nonlinear fluid pathway as a constricted fluid pathway. A diverter port is between the inlet orifice and the venturi tube and is in fluid communication with the inlet tube. The diverter port may be configured to divert a portion of the feeder fluid from the inlet arm into the container. An injection port is between the constricted fluid pathway and the outlet orifice and is in fluid communication with the outlet tube. The injection port is configured to receive the product from the container. The housing may further include a valve arm collinearly aligned with the venturi tube and the outlet arm. A valve stem having proximal and distal ends may be positioned within the valve arm and may be selectively movable to adjust the volume of the constricted fluid pathway.

In a further aspect of the present invention, the inlet orifice may be oriented orthogonal to the outlet orifice and the valve stem may be threadably mounted within the valve arm wherein the proximal end resides within at least of portion of the venturi tube. The distal end may include a knob to selectively position the proximal end within the venturi tube. The venturi tube may also include a tapered inner wall and the proximal end of the valve stem may terminate in a valve head configured to reside within at least a portion of the tapered inner wall.

In accordance with another aspect of the present invention, the present invention may be directed to a fluid injection system comprising a container holding a product to be dispersed and a fluid injection device removably coupled to the container. The fluid injection device may comprise a housing, a diverter tube, an injection tube and a valve stem. The housing may have an inlet arm defining an inlet tube having an inlet orifice configured to receive a feeder fluid and an outlet arm defining an outlet tube having an outlet orifice configured to discharge a mixed fluid of the product and feeder fluid. A venturi tube is between the inlet tube and the outlet tube, wherein the inlet tube, veturi tube and outlet tube define a nonlinear fluid pathway between the inlet orifice and the outlet orifice. The venturi tube redefines at least a portion of the nonlinear fluid pathway as a constricted fluid pathway. A diverter port is between the inlet orifice and the venturi tube and is in fluid communication with the inlet tube. The diverter port may be configured to divert a portion of the feeder fluid from the inlet arm into the container. An injection port is between the constricted fluid pathway and the outlet orifice and is in fluid communication with the outlet tube. The injection port is configured to receive the product from the container.

The housing may further include a valve arm collinearly aligned with the venturi tube and the outlet arm. The diverter tube may be coupled to the diverter injection port at a first end and to the container at a second end whereby a portion of the feeder fluid is diverted from the inlet tube to the container. The diverted feeder fluid is deposited to layer atop the product within the container. The injection tube may be coupled to the injection port at a first end and may be in fluid communication with the product at a second end whereby the product is drawn from the container and injected into the outlet tube to produce the mixed fluid before being discharged through the outlet orifice. The valve stem has proximal and distal ends with the valve stem positioned within the valve arm and selectively movable to adjust an open volume of the constricted fluid pathway.

In accordance with a further aspect of the present invention, the container may include a closure. The closure may comprise a lid, a seal and a collar. The lid may have a top face and an opposing bottom face. First and second nibs may extend outwardly from the top face and a ring may extend inwardly from the bottom face. The ring is in fluid communication with the second nib. The lid may further include a circumferential groove. The seal is configured to be received within the groove where the seal is proportioned to seat against a mouth opening of the container to form an airtight seal therebetween. The collar is configured to overlap at least a portion of the lid and is mountable to the container to removably secure the lid to the container and facilitate the airtight seal.

In a further aspect of the present invention, the diverter tube is coupled to the first nib and the injection tube is coupled to the second nib. The lid may further include a product injection tube coupled to the ring at a first end, wherein the first end is fluidly connected to the injection tube, and configured to reside within the product at a second end. The collar may also include a set of collar threads, with the container including a corresponding set of container threads. The collar may threadably engage the container to secure the lid. The collar may freely wind and unwind upon the container threads without causing the lid to rotate.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
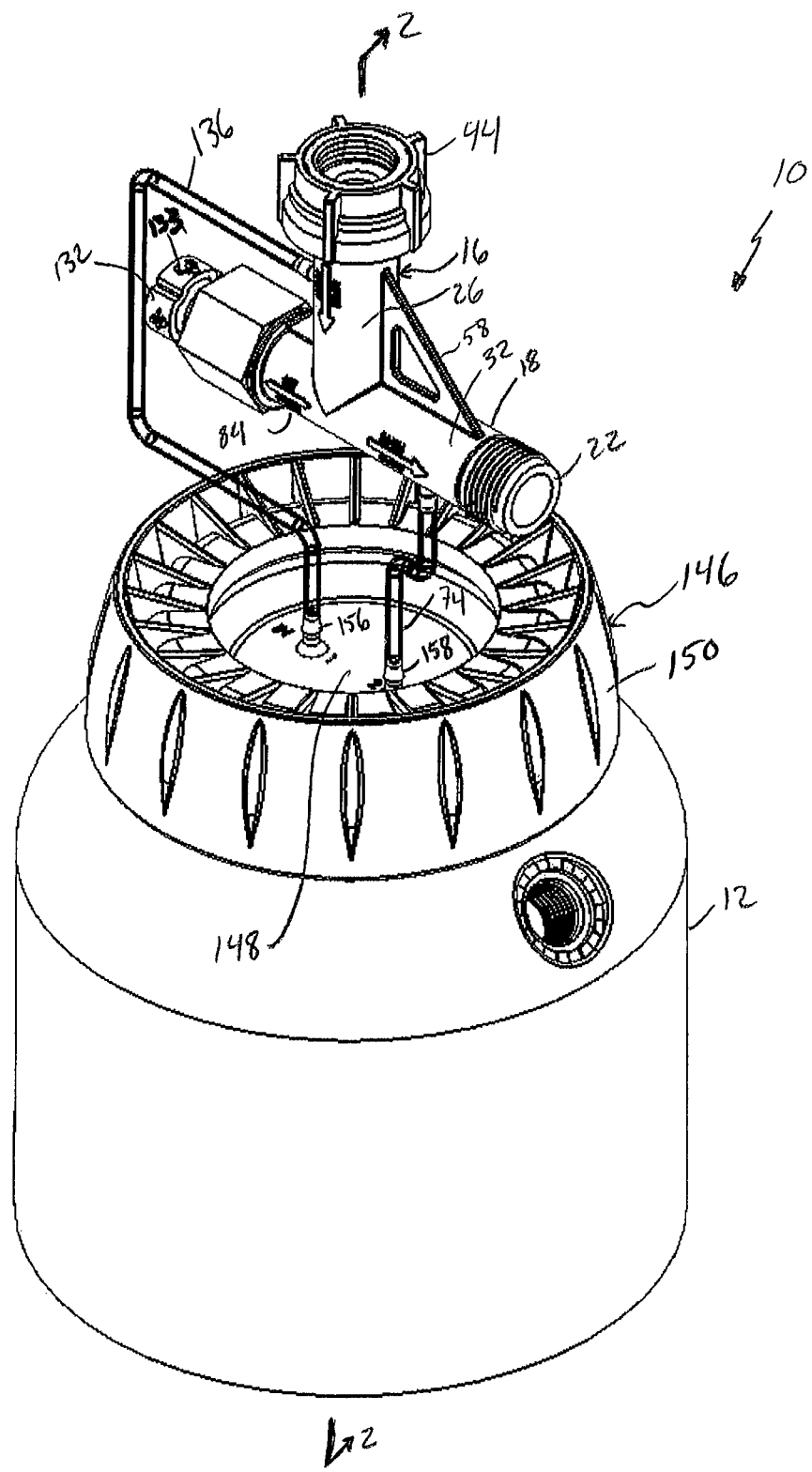
FIG. 1 is a perspective view of a fluid injection system in accordance with an aspect of the present invention.
Figure 2:
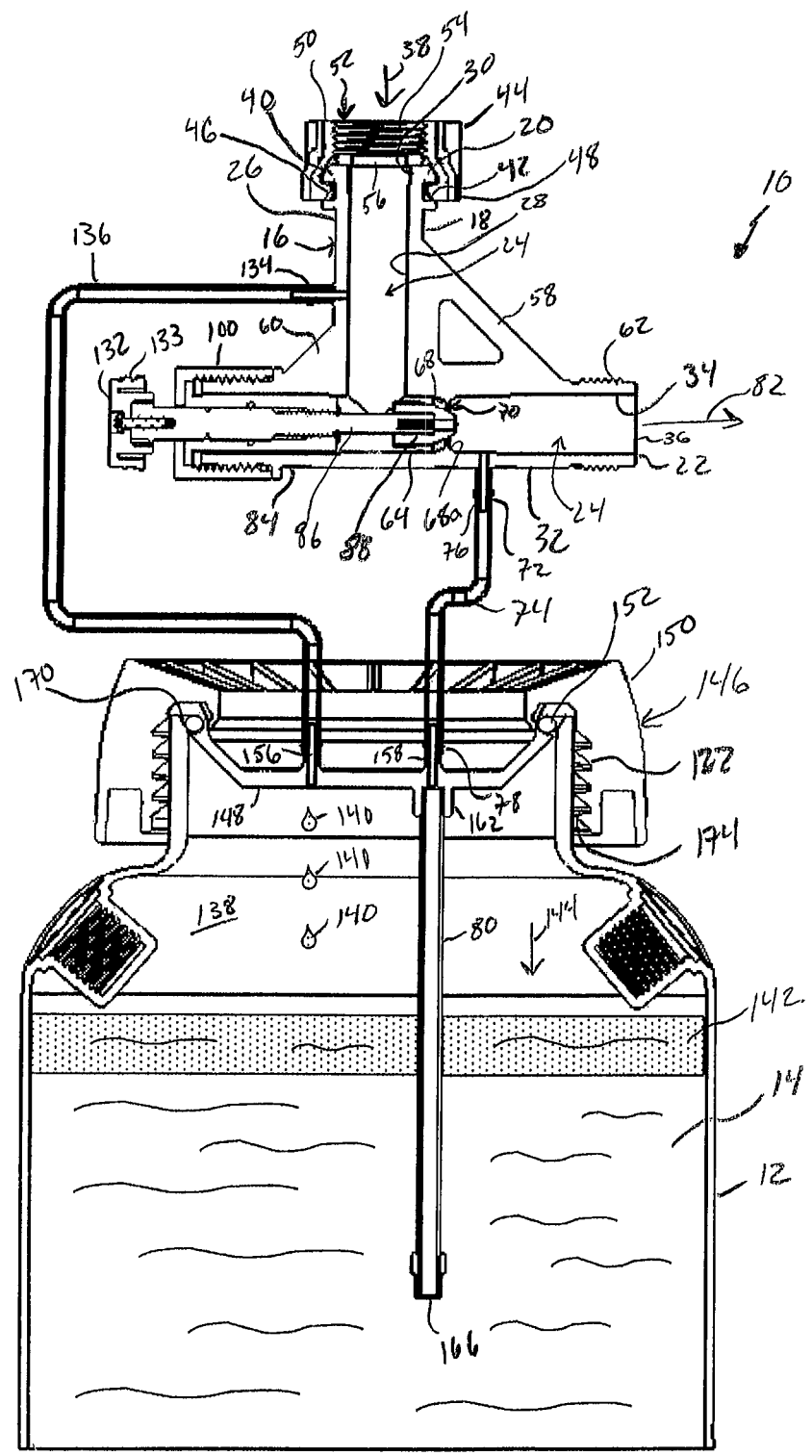
FIG. 2 is a cross-section view of the fluid injection system shown in FIG. 1, taken generally along line 2-2.

Referring now to FIGS. 1 and 2 there is shown a fluid injection system 10 in accordance with an aspect the present invention. Fluid injection system 10 may generally include a container 12 configured to hold a product 14 therein. Product 14 may be a dry soluble product or may be a product solution. Non-limiting examples of suitable products may include pesticides, herbicides or fertilizers. Coupled to container 12 is a fluid injection device 16. Fluid injection device 16 generally includes a housing 18 having opposing first and second ends 20, 22 defining a fluid pathway 24 therebetween. In accordance with an aspect of the present invention, housing 18 comprises an inlet arm 26 defining an inlet tube 28 having an inlet orifice 30 at first end 20 and an outlet arm 32 defining an outlet tube 34 having an outlet orifice 36 at second end 22 (see also FIGS. 3-5). Inlet tube 28 and outlet tube 34 may be oriented at an angle with respect to one another such that fluid pathway 24 is nonlinear between inlet orifice 30 and outlet orifice 36. In one aspect of the present invention, inlet tube 28 may be oriented orthogonally to outlet tube 34.

Inlet arm 26 is configured to receive a feeder fluid 38, such as but not limited to water received from a hose, faucet or hose bibb, via inlet orifice 30. Feeder fluid 38 is then discharged through outlet orifice 36 as will be discussed in greater detail below. To that end and with reference to FIGS. 3-5, first end 20 may terminate in a flange 40 with groove 42 defined therein. A coupling 44 may include a corresponding annular tongue 46 configured to reside within groove 42 of flange 40 at a coupling first end 48. Opposing coupling second end 50 may define a threaded opening 52 including, for example female threads 54. A gasket 56, may be interposed between female threads 54 and first end 20 of housing 18. In this manner, coupling 44 may receive a corresponding male threaded coupling, such as from a hose, faucet or hose bibb whereby female threads 54 matingly thread with male threads on the hose, faucet or hose bibb. Tongue 46 of coupling 44 may freely rotate within groove 42 of flange 40 until the male threaded coupling is firmly seated against gasket 56 and first end 20 in a substantially watertight seal. Free rotation of coupling 44 may assist in mounting of fluid injector device 16 without imposing any twisting or torque on housing 18. To provide additional structural stability, housing 18 may include one or more buttressing elements 58, 60 supporting inlet arm 26 and outlet arm 32. Second end 22 of outlet arm 32 may include a set of threads, such as male threads 62, which are configured to couple with female threads of a second hose, e.g., a standard garden hose, or a hose nozzle (not shown).

Figure 3:
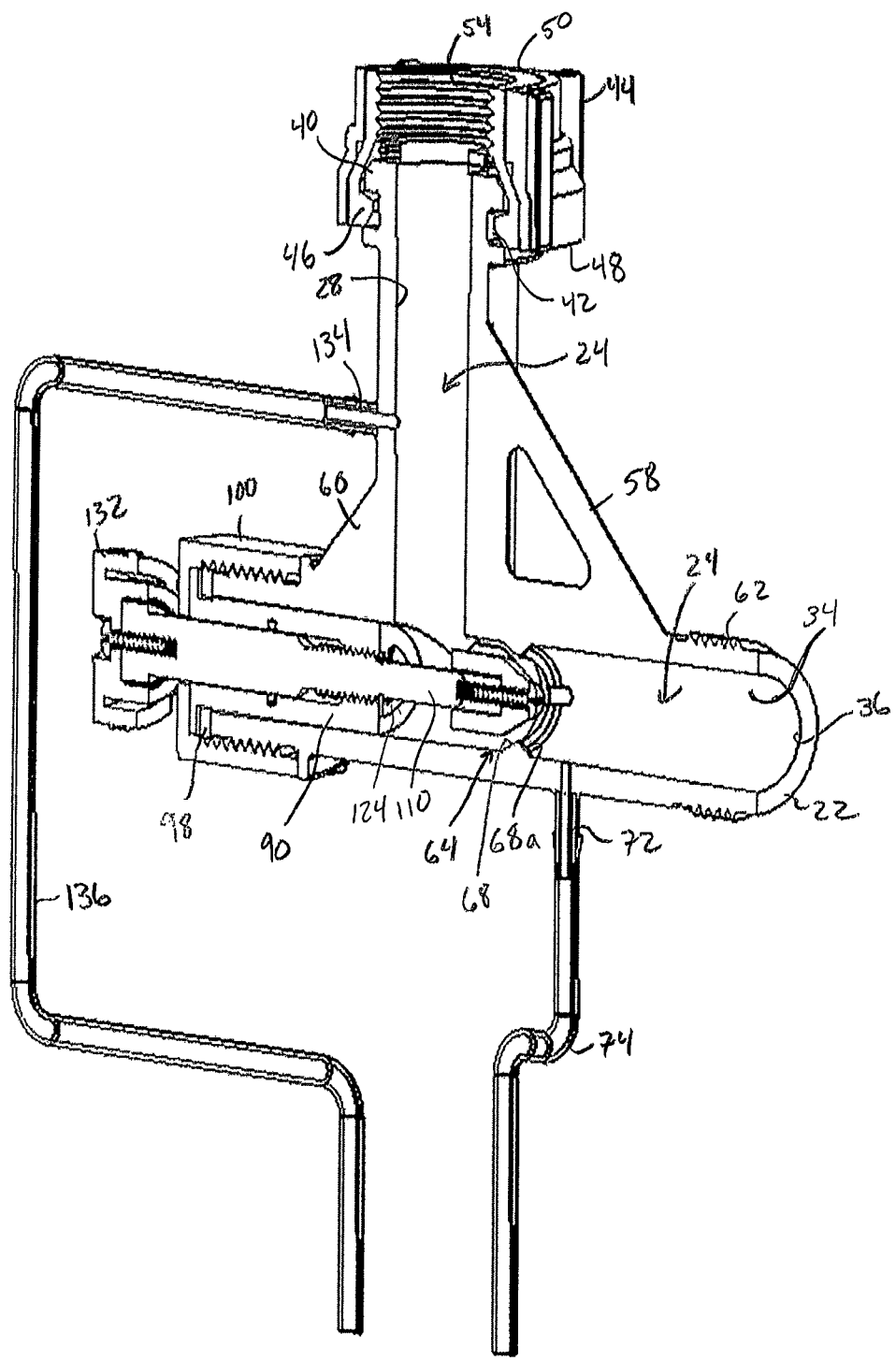
FIG. 3 is an isolated cross section view of a fluid injection device suitable for use within the fluid injection system shown in FIGS. 1 and 2 with the closure and container omitted for clarity.
Figure 4:
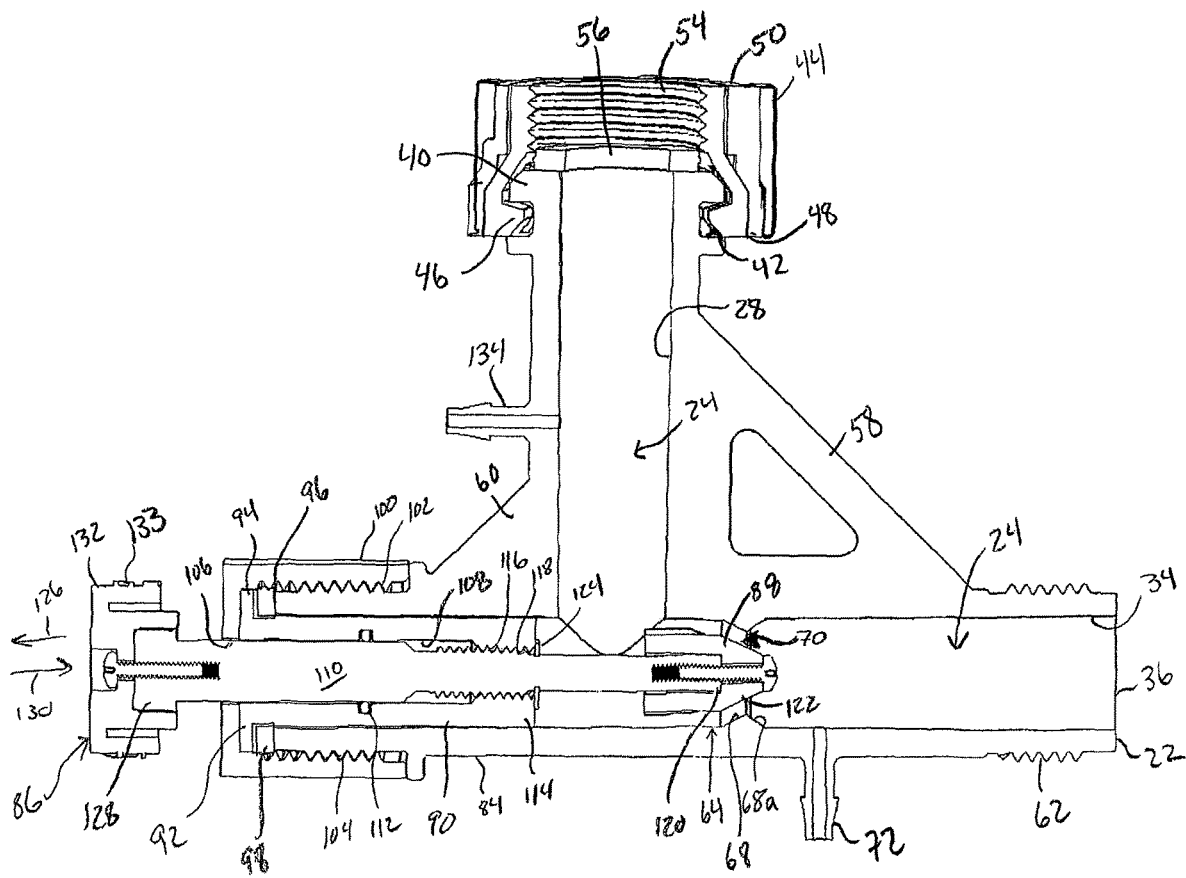
FIG. 4 is a side cross section view of the fluid injection device shown in FIG. 3 with the valve stem in a fully open orientation and the injection tube and diverter tube removed.
Figure 5:
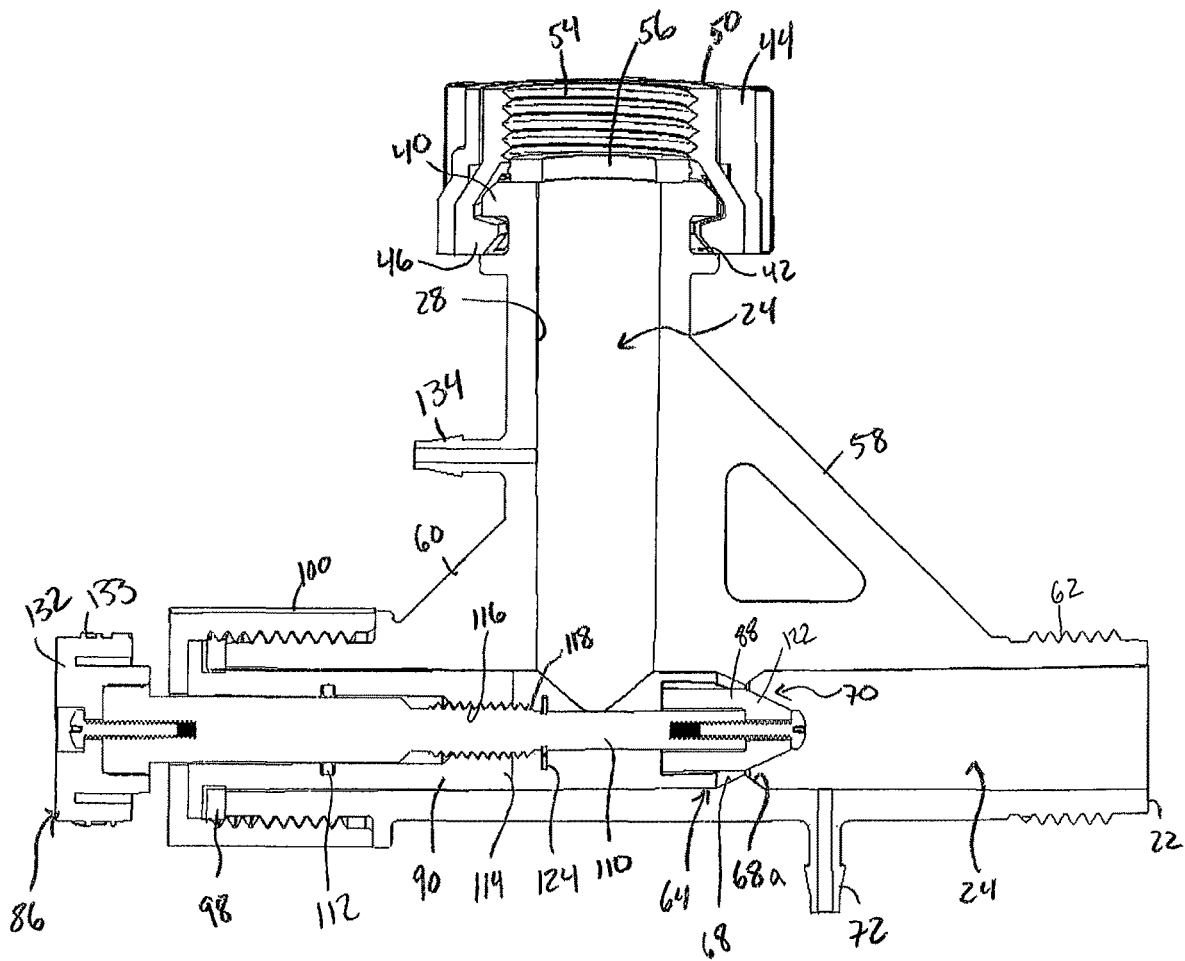
FIG. 5 is a side cross section view of the fluid injection device shown in FIG. 4 with the valve stem in a partially closed orientation.

With continued reference to FIGS. 3-5, housing 18 further includes a venturi tube portion 64 between inlet tube 28 and outlet tube 34. Venturi tube portion 64 includes a tapered inlet wall portion 68 and tapered outlet wall portion 68a so as to redefine a portion of fluid pathway 24 as constricted fluid pathway 70. As is known in the art, as feeder fluid 38 passes through constricted fluid pathway 70, its velocity increases resulting in a decrease in pressure which manifests as a partial vacuum at tapered outlet wall portion 68a and the area of outlet tube 34 immediately downstream thereof. To that end, outlet arm 32 may further include an injection port 72 disposed proximate venturi tube portion 64, such as between tapered outlet wall portion 68a and outlet orifice 36. Injection port 72 is in fluid communication with outlet tube 34. An injection tube 74 may be coupled to injection port 72 at a first end 76 while a second end 78 is fluidly coupled with product 14, such as via product injection tube 80 (see FIG. 2). In this manner, as feeder fluid 38 flows from inlet orifice 30 through constricted fluid pathway 70 and thereby creating a partial vacuum at and immediately following tapered outlet wall portion 68a, product 14 may be drawn from container 12 through injection tube 74 (via product injection tube 80) into outlet tube 34. Product 14 may then mix with feeder fluid 38 within outlet tube 34 so as to produce a diluted product fluid 82 that is discharged through outlet orifice 36.

To meter the magnitude of the drop in pressure and resultant partial vacuum within venturi tube portion 64, housing 18 may further include a valve arm 84 collinearly aligned with venturi tube portion 64 and outlet tube 34. Valve stem 86 may reside within valve arm 84 such that proximal end 88 of valve stem 86 may extend toward and within a portion of venturi tube portion 64. Changing the position of proximal end 58 within tapered inlet wall portion 68 of venturi tube portion 64 selectively increases or decreases the velocity of feeder fluid 38 and the resultant pressure drop and partial vacuum within outlet tube 34 by variably controlling the open volume of constricted fluid pathway 70. In this manner, the volume of product 14 drawn through injection tube 74 may be selectively regulated and adjusted.

In one aspect of the present invention, the valve stem may be directly threadably coupled within the valve arm. In a further aspect of the present invention, and as shown most clearly in FIGS. 3-5, valve stem 86 may include a valve housing 90 proportioned to fit snuggly within valve arm 84. Distal end 92 of valve housing 90 may include a flange 94 configured to overlap terminus 96 of valve arm 84. A gasket or seal 98 may be positioned between flange 94 and valve arm terminus 96. Valve cap 100, having threads 102, may then be threadably received by mating threads 104 defined on valve arm 84. Valve cap 100 may then be tightened so as to compress gasket 98 and thereby form a substantially watertight seal between flange 94 and terminus 92.

Valve cap 100 and valve housing 90 may also include respective through bores 106, 108 proportioned to receive valve rod 110 therethrough. A seal, such as O-ring 112, may be configured to form a substantially watertight seal between valve housing 90 and valve rod 110. Proximal end 114 of valve housing 90 may include threads 116 configured to receive mating threads 118 on valve rod 110. Thus, rotation of valve rod 110 selectively positions proximal end 120 of valve rod 110 within venturi tube portion 64 as described above.

Figure 6:
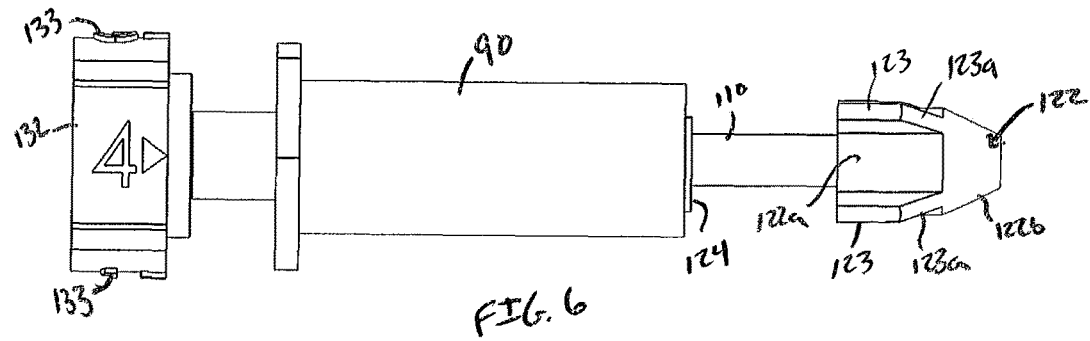
FIG. 6 is a side elevational view of a valve stem suitable for use within the fluid injection device shown in FIGS. 3-5.
Figure 7:
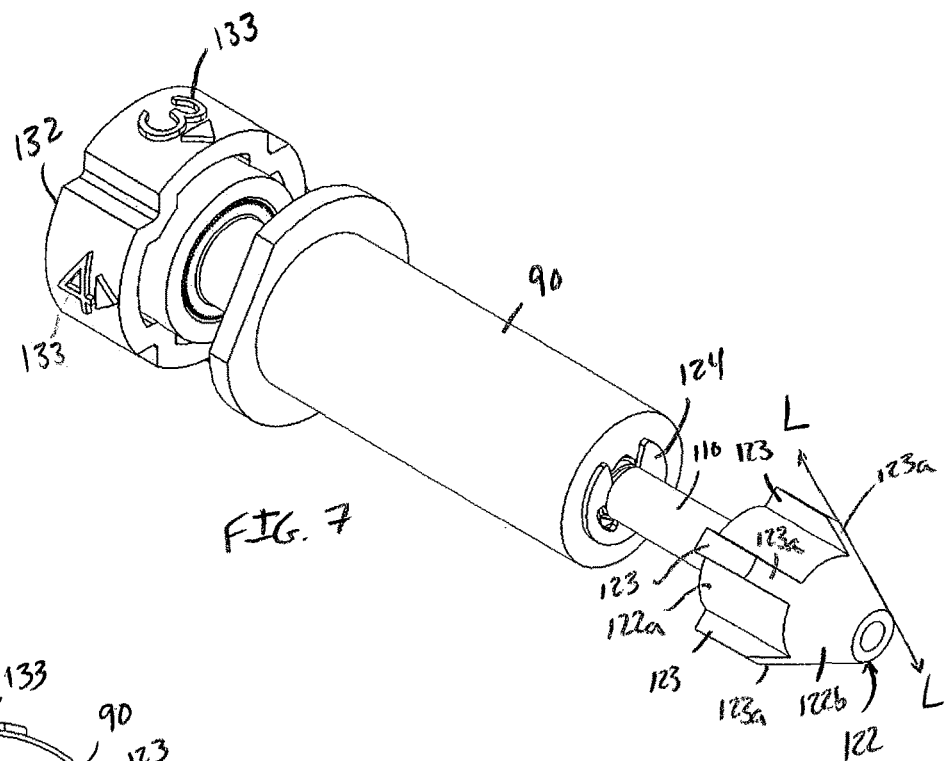
FIG. 7 is a perspective view of the valve stem shown in FIG. 6.
Figure 8:
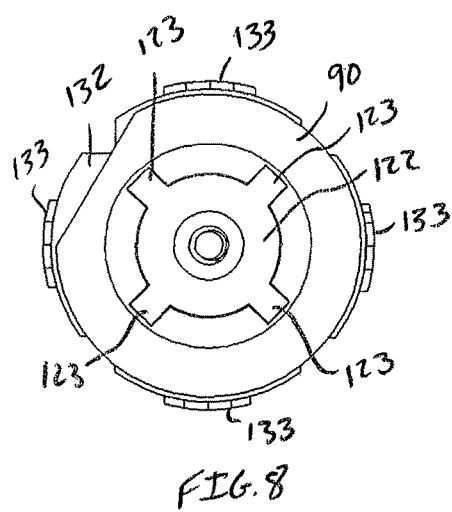
FIG. 8 is a top plan view of the valve stem shown in FIG. 6.

With additional reference to FIGS. 6-8, proximal end 120 of valve rod 110 may terminate in a valve head 122 proportioned to be received within constricted fluid pathway 70 defined by venturi tube portion 64 and tapered inlet wall portion 68. To that end, valve head 122 may be configured to include an inner cylindrical wall portion 122a and a tapered truncated cone portion 122b, wherein truncated cone portion 122b is adjustably positioned within venturi tube portion 64. Valve rod 110 may further include a rotation limiter, such as a lock washer 124, to limit outward travel of valve rod 110 within valve housing 90, generally indicated by reference arrow 126 (FIG. 4). Distal end 128 of valve rod 110 may be configured to limit inward travel (generally indicated by reference arrow 130) through physical engagement with valve cap 100.

In a further aspect of the present invention, cylindrical wall portion 122a of valve head 122 may include a plurality of longitudinally extending vanes 123 radially spaced apart from one another about the circumference of cylindrical wall portion 122a. Vanes 123 may engage tapered inlet wall portion 68 when valve rod 110 is fully advanced through inward travel 130. To that end, vanes 123 may include a tapered region 123a configured to coincide with truncated cone portion 122b at a straight angle as generally indicated by line L-L in FIG. 7. In this manner, vanes 123 (such as via tapered regions 123a) may provide a stop to the inward travel of valve rod 110 by engaging tapered inlet wall portion 68 while also maintaining an open fluid flow pathway between adjacent spaced vanes 123. As such, feeder fluid 38 may pass from inlet tube 28, through venturi tube portion 64 to outlet tube 34 as described above. With vanes 123, and thus valve head 122 and valve rod 110 in the fully inward travel position, constricted fluid pathway 70 is at its maximum constriction (i.e., minimum flow volume) such that the highest proportional dosage rate of product 14 within feeder fluid 38 may be achieved due to the resultant pressure drop described above.

In a further aspect of the present invention, distal end 128 of valve rod 110 may include a knob 132 to assist rotation of valve rod 110 within valve housing 90. Knob 132 may further include indicia 133 which indicate the relative position of proximal end 120 within constricted fluid pathway 70. In this manner, the open volume of venturi tube portion 64 (and therefore the volume of product 14 drawn into outlet tube 34) may be readily discerned and easily adjusted by the user.

Upon drawing of product 14 through injection tube 74 as described above, container 12 will experience a negative internal pressure/partial vacuum. To that end, inlet arm 26 of housing 18 may include a diverter port 134 located between inlet orifice 30 and venturi tube portion 64 with diverter port 134 in fluid communication with inlet tube 28. A diverter tube 136 may then fluidly couple diverter port 134 (and inlet tube 28) with the interior headspace 138 of container 12 (see FIG. 2). In this manner, a portion 140 of feeder fluid 38 may be drawn through diverter tube 136 via the partial vacuum generated within container 12 by operation of venturi tube portion 64. Portion 104 of feeder fluid 38 is then deposited within container 12 where it may, in accordance with an aspect of the present invention, form a liquid layer 142 layered atop product 14. Liquid layer 142 may operate to apply a downward force (shown generally as arrow 144) upon product 14 without significantly diluting product 14 (some minimal dilution may occur at the boundary between liquid layer 142 and product 14, but bulk dilution may be avoided). The rate of deposition of portion 140 (and development of liquid layer 142), as well as the rate of withdrawal of product 14 via injection port 72, is determined by the relative position of valve stem 86 and the reduced volume of venturi tube portion 64. At each valve stem 86 setting, injection port 72 and diverter port 134 may operate to equalize pressure in container 12 such that fluid injection device 16 may be generally referred to as a push-pull injector.

In a further aspect of the present invention, with reference to FIGS. 1, 2 and 6, container 12 may include a closure 146 generally comprised of a lid 148, collar 150 and seal 152. Top face 154 of lid 148 includes a pair of outwardly extending nibs 156, 158. A first nib, for instance nib 156, may couple with diverter tube 136 so as to promote transfer of portion 140 of feeder fluid 38 from inlet tube 28 to container 12 interior as described above. The second nib, i.e., nib 158, may couple with injection tube 74 to provide fluid communication between fluid injection device 16 and lid 148. The opposing bottom face 160 of lid 148 may include a coupling 162 corresponding to and in fluid communication with second nib 158. Product injection tube 80 may then be mounted to coupling 162 at a first end 164 while its opposing second end 166 resides within product 14. In this manner, the partial vacuum formed by venturi tube portion 64 may withdraw product 14 from container 12 through injection tube 74 and product injection tube 80 as described above.

Figure 9:
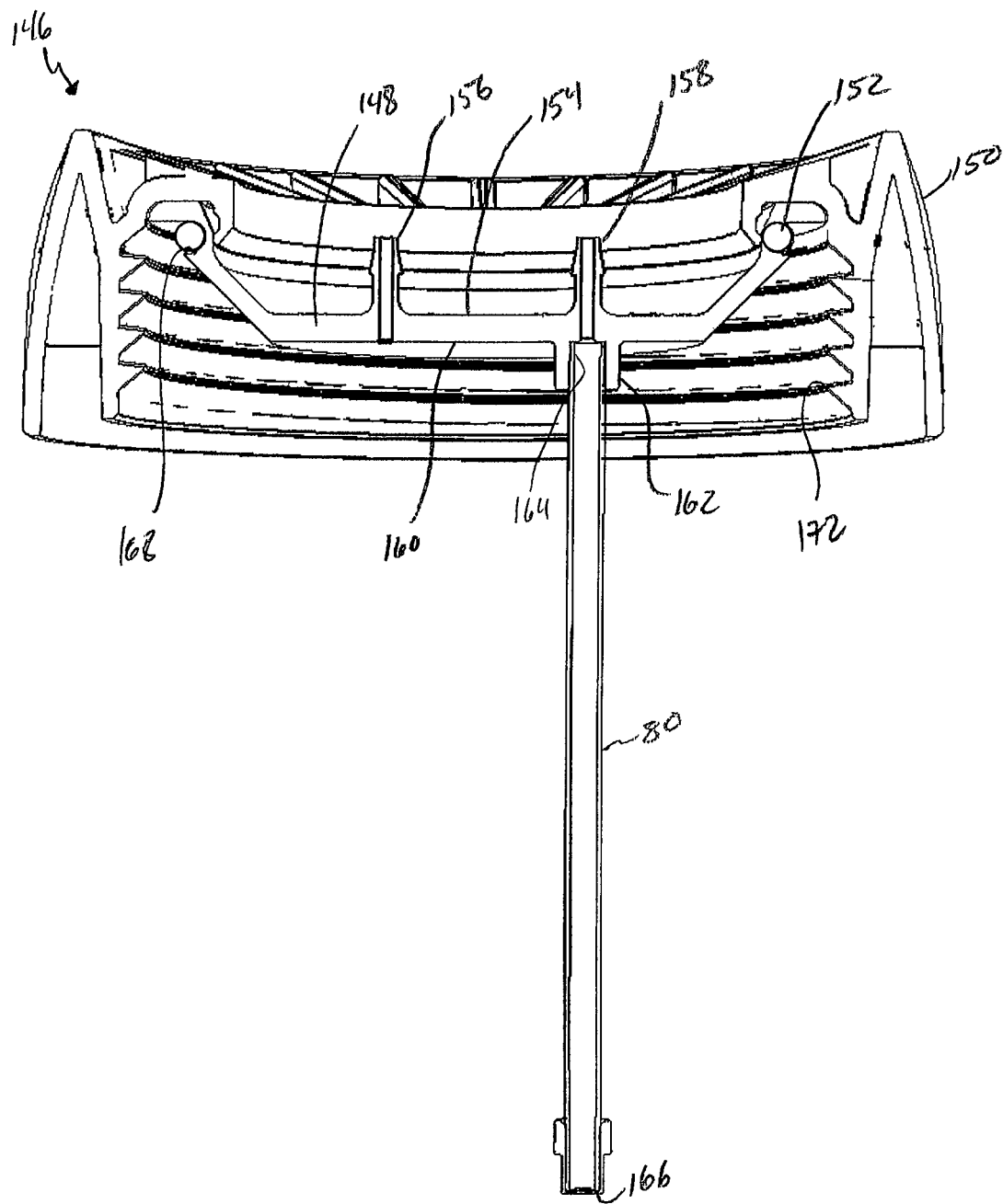
FIG. 9 is an isolated cross section view of a closure suitable for use within the fluid injection system shown in FIGS. 1 and 2.

As shown most clearly in FIG. 9, lid 148 includes a circumferential groove 168 configured to receive seal 152. Seal 152 and lid 148 may seat against mouth opening 170 of container 12 (see FIG. 2) such that seal 152 may form an airtight seal between lid 148 and container 12 so as to promote withdrawal of product 14 from contain 12 as described above. Collar 150 may then overlap a portion of lid 148. Threads 172 on collar 150 may threadably engage corresponding threads 174 formed on container 12 such that collar 150 may be tightened onto container 12, thereby exerting a compression force between seal 152 and mouth opening 170 so as to provide the airtight seal. In accordance with one aspect of the present invention, collar 150 may threadably wind/unwind upon threads 174 without causing lid 148 to rotate. As a result, closure 146 may be selectively removed from/mounted onto container 12 without twisting fluid injection device 16, diverter tube 136 or injection tube 74.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A fluid injection device configured for use with a container holding a product to be dispersed, the fluid injection device comprising:
   a) a housing including:
      i) an inlet arm defining an inlet tube having an inlet orifice configured to receive a feeder fluid;
      ii) an outlet arm defining an outlet tube having an outlet orifice configured to discharge a mixed fluid comprising the product and feeder fluid;
      iii) a venturi tube portion between the inlet tube and the outlet tube, wherein the inlet tube is arranged orthogonal to the venturi tube portion and outlet tube so as to define a nonlinear fluid pathway between the inlet orifice and the outlet orifice, and wherein the venturi tube portion redefines at least a portion of the nonlinear fluid pathway as a constricted fluid pathway;
      iv) a diverter port located on the inlet arm and in fluid communication with the inlet tube and configured to divert a portion of the feeder fluid from the inlet arm into the container; and
      v) an injection port between the constricted fluid pathway and the outlet orifice, the injection port in fluid communication with the outlet tube and configured to receive the product from the container;
      vi) a valve arm collinearly aligned with the venturi tube portion and the outlet arm; and
   b) a valve stem having proximal and distal ends, the valve stem positioned within the valve arm and selectively movable to adjust an open volume of the constricted fluid pathway.

2. The fluid injection device of claim 1 wherein the valve stem includes a solid valve rod threadably mounted within the valve arm wherein the proximal end resides within at least of portion of the venturi tube portion and the distal end includes a knob to selectively position the proximal end within the venturi tube portion.

3. The fluid injection device of claim 1 wherein the venturi tube portion includes a tapered inlet wall portion and the proximal end of the valve stem terminates in a valve head configured to reside within at least a portion of the tapered inlet wall portion.

4. The fluid injection device of claim 3 wherein the valve head includes a plurality of outwardly extending vanes spaced apart from one another, each vane configured to contact the tapered inlet wall portion while also maintaining an open fluid pathway between adjacent spaced vanes to direct the feeder fluid from the inlet tube to the outlet tube when the valve stem is in a fully inward travel position.

5. A fluid injection system comprising:
   a. a container holding a product to be dispersed;
   b. a fluid injection device removably coupled to the container, the fluid injection device comprising:
      i) a housing including:
         a) an inlet arm defining an inlet tube having an inlet orifice configured to receive a feeder fluid;
         b) an outlet arm defining an outlet tube having an outlet orifice configured to discharge a mixed fluid comprising the product and feeder fluid;
         c) a venturi tube portion between the inlet tube and the outlet tube, wherein the inlet tube is arranged orthogonal to the venturi tube portion and outlet tube so as to a nonlinear fluid pathway between the inlet orifice and the outlet orifice, and wherein the venturi tube portion redefines at least a portion of the nonlinear fluid pathway as a constricted fluid pathway;
         d) a diverter port located on the inlet arm and in fluid communication with the inlet tube and configured to divert a portion of the feeder fluid from the inlet arm into the container;
         e) an injection port between the constricted fluid pathway and the outlet orifice, the injection port in fluid communication with the outlet tube and configured to receive the product from the container;
         f) a valve arm collinearly aligned with the venturi tube portion and the outlet arm;
      ii) a diverter tube coupled to the diverter injection port at a first end and to the container at a second end whereby a portion of the feeder fluid is diverted from the inlet tube to the container, the diverted feeder fluid configured to layer atop the product within the container;
      iii) an injection tube coupled to the injection port at a first end and in fluid communication with the product at a second end whereby the product is drawn from the container and injected into the outlet tube to produce the mixed fluid before being discharged through the outlet orifice; and
      iv) a valve stem having proximal and distal ends, the valve stem positioned within the valve arm and selectively movable to adjust an open volume of the constricted fluid pathway.

6. The fluid injection system of claim 5 wherein the valve stem includes a solid valve rod threadably mounted within the valve arm wherein the proximal end resides within at least of portion of the venturi tube portion and the distal end includes a knob to selectively position the proximal end within the venturi tube portion.

7. The fluid injection system of claim 5 wherein the venturi tube portion includes a tapered inlet wall portion and the proximal end of the valve stem terminates in a valve head configured to reside within at least a portion of the tapered inlet wall portion.

8. The fluid injection system of claim 7 wherein the valve head includes a plurality of outwardly extending vanes spaced apart from one another, each vane configured to contact the tapered inlet wall portion while also maintaining an open fluid pathway between adjacent spaced vanes to direct the feeder fluid from the inlet tube to the outlet tube when the valve stem is in a fully inward travel position.

9. The fluid injection system of claim 5 wherein the container includes a closure, the closure comprising:
   a) a lid having a top face and an opposing bottom face, wherein first and second nibs extend outwardly from the top face and a ring extends inwardly from the bottom face wherein the ring is in fluid communication with the second nib, the lid further including a circumferential groove;
   b) a seal configured to be received within the groove; the seal proportioned to seat against a mouth opening of the container to form an airtight seal therebetween; and
   c) a collar configured to overlap at least a portion of the lid, wherein the collar is mountable to the container to removably secure the lid to the container and facilitate the airtight seal.

10. The fluid injection system of claim 9 wherein the diverter tube is coupled to the first nib and the injection tube is coupled to the second nib, and wherein the lid further includes a product injection tube coupled to the ring at a first end, wherein the first end is fluidly connected to the injection tube, and configured to reside within the product at a second end.

11. The fluid injection system of claim 9 wherein the collar includes a set of collar threads and the container includes a corresponding set of container threads, wherein the collar threadably engages the container to secure the lid.

12. The fluid injection system of claim 11 wherein the collar is configured to selectively wind and unwind upon the container threads without causing the lid to rotate.

\* \* \* \* \*